(12) United States Patent
Diosi et al.

(10) Patent No.: US 7,699,743 B2
(45) Date of Patent: Apr. 20, 2010

(54) MULTI-STEP TRANSMISSION

(75) Inventors: Gabor Diosi, Friedrichshafen (DE);
Josef Haupt, Tettnang (DE); Gerhard Gumpoltsberger, Friedrichsafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 464 days.

(21) Appl. No.: 11/816,761

(22) PCT Filed: Mar. 3, 2006

(86) PCT No.: PCT/EP2006/001937

§ 371 (c)(1),
(2), (4) Date: Aug. 21, 2007

(87) PCT Pub. No.: WO2006/094711

PCT Pub. Date: Sep. 14, 2006

(65) Prior Publication Data

US 2008/0161149 A1  Jul. 3, 2008

(30) Foreign Application Priority Data

Mar. 5, 2005  (DE) .................. 10 2005 010 210

(51) Int. Cl.
*F16H 3/62* (2006.01)
(52) U.S. Cl. ...................................... 475/277; 475/288
(58) Field of Classification Search .................. 475/271, 475/275, 277, 282, 283, 288, 289, 292, 296, 475/297, 311, 312, 317, 318
See application file for complete search history.

(56) References Cited

U.S. PATENT DOCUMENTS 4,046,031 A  9/1977  Ott et al.

(Continued)

FOREIGN PATENT DOCUMENTS

DE  29 36 969 A1  4/1981

(Continued)

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

The 8-gear multi-step transmission comprises a drive input shaft (AN), a drive output shaft (AB), four planetary gearsets (RS1, RS2, RS3, RS4), eight rotary shafts (1, 2, 3, 4, 5, 6, 7, 8) and five shift elements (A, B, C, D, E). An internal gear (HO1) of the first planetary gearset (RS1) and the drive input shaft (AN) are connected to one another as the first shaft (1). A carrier (ST4) of the fourth gearset (RS4) and the drive output shaft (AB) are connected to one another as the second shaft (2). A sun gear (SO2) of the second gearset (RS2), and a sun gear (SO3) of the third gearset (RS3) are connected to one another as the third shaft (3). An internal gear (HO2) of the second gearset (RS2) forms the fourth shaft (4). An internal gear (HO3) of the third gearset (RS3) forms the fifth shaft (5). A carrier (ST2) of the second gearset (RS2) and an internal gear (HO4) of the fourth gearset (RS4) are connected to one another as the sixth shaft (6). A sun gear (SO1) of the first gearset (RS1) and a sun gear (SO4) of the fourth gearset (RS4) are connected to one another as the seventh shaft (7). A carrier (ST1) of the first gearset (RS1) and a carrier (ST3) of the third gearset (RS3) are connected to one another as the eighth shaft (8).

41 Claims, 5 Drawing Sheets

U.S. PATENT DOCUMENTS

| | | |
|---|---|---|
| 4,395,925 A | 8/1983 | Gaus |
| 4,683,776 A | 8/1987 | Klemen |
| 6,176,803 B1 | 1/2001 | Meyer et al. |
| 6,634,980 B1 | 10/2003 | Ziemer |
| 6,960,149 B2 | 11/2005 | Ziemer |
| 7,014,589 B2 | 3/2006 | Stevenson |
| 7,018,319 B2 | 3/2006 | Ziemer |
| 2004/0102276 A1* | 5/2004 | Lee et al. .................. 475/271 |
| 2004/0102279 A1* | 5/2004 | Lee et al. .................. 475/276 |

FOREIGN PATENT DOCUMENTS

| | | |
|---|---|---|
| DE | 42 34 572 A1 | 4/1994 |
| DE | 42 38 025 A1 | 5/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 101 62 893 A1 | 7/2003 |
| DE | 10 2004 029 952 A1 | 1/2005 |

* cited by examiner

| GEAR | ENGAGED SHIFTING ELEMENTS | | | | | RATIO i | STEP φ |
| --- | --- | --- | --- | --- | --- | --- | --- |
| | BRAKE | | CLUTCH | | | | |
| | A | B | C | D | E | | |
| 1 | ● | ● | ● | | | 4.699 | 1.568 |
| 2 | ● | ● | | | ● | 2.998 | 1.408 |
| 3 | | ● | ● | | ● | 2.129 | 1.218 |
| 4 | | ● | | ● | ● | 1.747 | 1.318 |
| 5 | | ● | ● | ● | | 1.326 | 1.326 |
| 6 | | | ● | ● | ● | 1.000 | 1.222 |
| 7 | ● | | ● | ● | | 0.818 | 1.283 |
| 8 | ● | | | ● | ● | 0.638 | TOTAL 7.368 |
| R | ● | ● | | ● | | -3.032 | |

MULTI-STEP TRANSMISSION

This application is a national stage completion of PCT/EP2006/001937 filed Mar. 3, 2006 which claims priority from German Application Serial No. 10 2005 010 210.7 filed Mar. 5, 2005.

FIELD OF THE INVENTION

The present invention relates to a multi-step transmission in planetary design, particularly an automatic transmission for a motor vehicle.

BACKGROUND OF THE INVENTION

According to the state of the art, automatic transmissions, particularly for motor vehicles, comprise planetary gearsets, which are shifted using friction and/or control elements, such as clutches and brakes, and which are typically connected to a starting element that is subject to a slip effect and optionally provided with a converter lockup clutch, for example a hydrodynamic torque converter or a fluid clutch.

A multi-step transmission of this type is described, for example, in DE 199 49 507 A1 by the applicant. It basically comprises a drive input shaft and a drive output shaft arranged co-axially to one another, a total of four planetary gearsets and several frictional shift elements. Two non-shiftable, front-mounted gearsets are provided on the drive input shaft, which generate two rotational speeds on the output side, which, apart from the rotational speed of the drive input shaft, can be selectively shifted to several input elements of a shiftable, multi-component main planetary gearset acting upon the drive output shaft by selectively engaging the shift elements used, and are shiftable such that, for changing from one gear to the next higher or lower gear, of the two activated shift elements, only one shift element must be engaged or disengaged. The main gearset is in turn constructed as a two-carrier, four-shaft planetary gearset, whose both planetary gearsets are firmly coupled to one another, via two elements. By using five shift elements, seven forward gears are shiftable without range shifts, and by using six shift elements even nine or ten forward gears are shiftable.

Within the scope of DE 101 15 983 A1 by the applicant, a multi-step transmission is described, with a drive input shaft that is connected to a front-mounted gearset, which is connected to a rear-mounted gearset, and to a maximum of seven shift elements, via which, by selective shifting, at least eight forward gears may be shifted into without range shifts. The front-mounted gearset is formed by a shiftable or non-shiftable planetary gearset or by a maximum of two non-shiftable planetary gearsets coupled to one another. The rear-mounted gearset is constructed as a two-carrier, four-shaft transmission with two shiftable, rear-mounted, planetary gearsets having four free shafts. The first free shaft of this two-carrier, four-shaft transmission is connected to the first control element, the second free shaft with the second and third control elements, the third free shaft with the fourth and fifth control elements, and the fourth free shaft is connected to the output shaft. According to the above named invention, connecting the third free shaft or the first free shaft of the rear-mounted gearset additionally to a sixth shift element is proposed for a multi-step transmission with a total of six shift elements. For a multi-step transmission with a total of seven control elements, the invention proposes the additional connection of the third free shaft to a sixth shift element and the first free shaft to a seventh control element.

Several other multi-step transmissions are also known, for example, from DE 101 15 995 A1 by the Applicant, where four shiftable planetary gears coupled to one another and six or seven frictional shift elements are provided, via whose selective engagement a rotational speed of a drive input shaft of the transmission is so transmitted to a drive output shaft of the transmission, that nine or eleven forward gears and at least one reverse gear can be shifted into. Depending on the transmission diagram, two or three shift elements are engaged in each gear, whereby only one shift element is disengaged at a time on shifting from one gear to each of the next higher or lower gear, and a previously disengaged shift element is engaged to avoid range shifts.

An 8-gear multi-step transmission is further known from DE 29 36 969 A1, comprising eight co-axial simple planetary gearsets and eight frictional shift elements.

A multi-step automatic transmission is further known from U.S. Pat. No. 4,683,776, comprising four simple planetary gearsets and six frictional shift elements. All four planetary gearsets are designed as so called negative planetary gearsets in simple planetary design. The first two planetary gearsets, viewed from the input drive side form a shiftable front-mounted gearset, and are firmly connected to one another, via two shaft couplings, whereby the first shaft coupling of the front-mounted gearset firmly connects both sun gears with one another and with the drive input shaft of the transmission, and whereby the second shaft coupling of the front-mounted planetary gearset connects the internal gear of the first planetary gearset and the carrier of the second planetary gearset firmly to one another, simultaneously forms the output shaft of the front-mounted gearset. The other two elements of the front-mounted gearset, i.e., the carrier of the first planetary gearset and the internal gear of the second planetary gearset, may each be attached to the transmission housing via an individual brake. The third and fourth planetary gearset form a shiftable main gearset, and are likewise connected firmly to one another via two coupling shafts, whereby the first coupling shaft of this main gearset firmly connects both sun gears of the main gearset to one another, and whereby the second coupling shaft of the main gearset firmly connects the carrier of the third planetary gearset with the gear of the fourth planetary gearset, and is likewise connectable with the drive input shaft of the transmission, and is selectively attachable to the transmission housing, via a brake. The internal gear of the third planetary gearset, as a further input element of the main gearset, is firmly connected to the output shaft of the front-mounted gearset and may be attached to the transmission housing via a further brake. The carrier of the fourth planetary gearset finally forms the output element of the main gearset and is connected firmly to the drive output shaft of the transmission. The transmission enables nine forward drive gears to be shiftable without range shifts, and one reverse gear in total, implemented by selective engagement of two of he six shift elements at a time.

Furthermore, from U.S. Pat. No. 6,176,803 B1, a 9-gear automatic transmission is known with four shiftable simple planetary gearsets arranged co-axially to one another, which is very similar in design to the automatic transmission according to U.S. Pat. No. 4,683,776. Like in U.S. Pat. No. 4,683,776, a total of six frictional shift elements are provided, two of which are implemented as multi-disk clutches and four as multi-disk brakes. Unlike U.S. Pat. No. 4,683,776, the first of the four planetary gearsets viewed from the flow of power is designed as a plus planetary gearset in double planetary design. Like in U.S. Pat. No. 4,683,776, the other three planetary gearsets are constructed as minus planetary gearsets in simple planetary design. Except for the coupling of the sun gear of the second planetary gearset with the carrier of the first (plus) planetary gearset, the coupling of the planetary gearsets, the structural coupling of the planetary gearsets among them, with both clutches and drive input shaft respectively, with the four brakes as well as with the drive output shaft are identical with U.S. Pat. No. 4,683,776. In principle, in the 9-gear automatic transmission according to U.S. Pat. No. 6,176,803 B1 only the plus planetary gearset acts as a front-mounted gearset, whereby the other three planetary gearsets form the main gearset of the transmission.

Similar multi-step automatic transmissions with nine shiftable forward gears free of range shifts are further known: from DE 42 38 025 A1, comprising four co-axial simple planetary gear sets and six or seven frictional shift elements (four multi-disk brakes and two or three multi-disk clutches). Viewed in the flow of power, the two first planetary gearsets always form a front-mounted gearset coupled with the drive input shaft of the transmission, via two firmly connected coupling shafts, where one of its planetary gearsets is implemented as a plus planetary gearset in double planetary design, and its other planetary gearset is implemented as a minus planetary design in simple planetary design. The other two planetary gearsets form a main gearset designed as a two-carrier four-shaft planetary transmission identical to U.S. Pat. No. 4,683,776.

Automatic shiftable vehicle transmissions in planetary design have in general been described in the state of the art on many occasions, and are subject to continuous development and improvements. These transmissions should feature a sufficient number of forward gears as well as one reverse gear and an excellently suitable gear ratio for motor vehicles with a high overall ratio spread as well as favorable progressive ratios. Furthermore, they should allow a high start gear ratio in the forward direction and include a direct gear, and additionally be suited for use in both passenger cars and commercial vehicles. In addition, these transmissions should require low design and construction costs, in particular a small number of shift elements, and avoid double shifts during sequential gear shifts, so that only one element at a time is changed when shifting in defined gear groups.

The object of the present invention is to propose a multi-step transmission of the type mentioned above with at least eight shiftable forward gears and at least one reverse gear, where, by using a total of four planetary gearsets, a preferably small number of shift elements is required. All forward gears should be free of range shifts during sequential gear shifts, i.e., when changing from a forward gear to the next higher or lower gear, only one previously engaged shift element should be disengaged and a previously disengaged shift element should be engaged each time. In addition, the transmission should exhibit a large transmission-ratio spread with comparably harmonic gear shifting, and manifest a favorable degree of efficiency, i.e., comparatively low drag and gear losses, in the main driving gears.

SUMMARY OF THE INVENTION

Thus, a multi-step transmission in planetary design is proposed that features one drive input shaft, one drive output shaft, four planetary gearsets, at least eight rotary shafts as well as five shift elements—two brakes and three clutches, whose selective meshing produces different gear ratios between the drive input shaft and the drive output shaft, so that eight forward gears and one reverse gear can be implemented.

According to the present invention, an internal gear of the first planetary gearset and the drive input shaft are connected in a rotationally fixed manner to one another, and form the first transmission shaft. One carrier of the fourth planetary gearset and the drive output shaft are connected torsion proof to one another, and form the second transmission shaft. One sun gear of the second planetary gearset and one sun gear of the third planetary gearset are connected in a rotationally fixed manner to one another, and form the third transmission shaft. One internal gear of the second planetary gearset forms the fourth transmission shaft. One internal gear of the third planetary gearset forms the fifth transmission shaft. One carrier of the second planetary gearset and one internal gear of the fourth planetary gearset are connected in a rotationally fixed manner to one another and form the sixth transmission shaft. One sun gear of the first planetary gearset and one sun gear of the fourth planetary gearset are connected in a rotationally fixed manner to one another and form the seventh transmission shaft. One carrier of the first planetary gearset and one carrier of the third planetary gearset are connected in a rotationally fixed manner to one another and form the eighth transmission shaft.

The proposal regarding the connection of the five shift elements to the different elements of the planetary gearsets according to the present invention is, that the first shift element is placed in the flow of power between the third shaft a transmission housing, the second shift element is positioned in the flow of power between the fourth shaft and the transmission housing, the third shift element is placed in the flow of power between either the first and seventh shaft, the first and eighth shaft or between the seventh and eighth shaft, the fourth shift element is positioned in the flow of power between the fifth and sixth shaft, and that the fifth shift element is placed in the flow of power between the fifth and seventh shaft. Thus, according to the present invention, a complete transmission family results via the three different kinematic coupling alternatives of the third shift element with the different transmission shifts.

According to the present invention, the first forward gear results from engaging the first, second and third shift elements, the second forward gear from engaging the first, second and fifth shift elements, the third forward gear from engaging the second, third and fifth shift elements the fourth forward gear from engaging the second, fourth and fifth shift elements, the fifth forward gear from engaging the second, third and fourth shift elements, the sixth forward gear from engaging the third, fourth and fifth shift elements, the seventh forward gear from engaging the first, third and fourth shift elements, and the eighth forward gear from engaging the first, fourth and fifth shift elements. The reverse gear results from engaging the first, second and fourth shift elements.

All four planetary gearsets are preferable implemented as so-called minus planetary gearsets, whose corresponding planetary gears with sun gear and internal gear engage with the respective planetary gearset.

With respect to the spatial layout of the four planetary gearsets in the transmission housing, an advantageous embodiment is proposed where all four planetary gearsets are arranged co-axial to one another, in the sequential order of "first, third, second, fourth planetary gearset". For an application with the drive input shaft and drive output shaft co-axial to one another, it is convenient in this case if the first planetary gearset is the first planetary gearset of the group of planetary gearsets facing the input drive of the transmission. With respect to the spatial layout of the planetary gearset sequential order of "first, third, second, fourth planetary gearset", it is convenient if, in relation to the spatial layout, the first and second shift element are arranged axially adjacent to one another radially in an area above the second and/or third planetary gearsets, in particular radially in an area above the second and/or third planetary gearset.

In another advantageous embodiment, the proposal with respect to the relative layout of the four planetary gearsets to one another is, that all four planetary gearsets are arranged co-axial to one another in the sequential order of "second, third, first, fourth planetary gearset". For an application with the drive input shaft and drive output shaft running co-axial to one another, it is convenient in this case if the second planetary gearset is the planetary gearset facing the group of planetary gearsets. In conjunction with this spatial planetary gearset sequential order of "second, third, first, fourth planetary gearset", the first and second shift elements can be positioned, with respect to their spatial layout, consecutively axial to one another, or also radially above one another in an area next to the second planetary gearset and next to a radial wall of the transmission housing.

In addition, both layouts of the four planetary gearsets are also appropriate for a non-co-axial arrangement of the drive input shaft and drive output shaft of the transmission, for example, the input drive and output drive can be arranged axially parallel or at an angle to one another.

By way of an embodiment of the multi-step transmission according to the present invention, there results appropriate gear ratios with a high overall ratio spread in harmonic gear shifting for motor vehicles, which leads to excellent driving comfort and a significant decrease in fuel consumption.

Furthermore, with the multi-step transmission according to the present invention requiring a reduced amount of shift elements, namely two brakes and three clutches, the design and construction costs are comparatively low. With the multi-step transmission according to the present invention, it is advantageously possible to initiate drive with a hydrodynamic converter, an external start clutch or also other adequate external starting elements. It is also conceivable to initiate drive, via a starting element, incorporated in the transmission. One of the two brakes, which is actuated in the first and second forward gears and reverse gear, is preferably suitable for this purpose.

In addition, a favorable degree of efficiency is achieved in all main drive gears with the multi-step transmission, as a consequence of low drag losses, since in each gear only two shift elements are not respectively engaged and, because of the low gear losses in the simply constructed planetary gearsets.

In addition, the multi-step transmission according to the present invention is designed to be adaptable to different power train arrangements in the direction of the flow of power as well as from the spatial perspective. Thus, the drive input and drive output of the transmission can, for example, be optionally arranged co-axially or axially parallel to one another without special constructive arrangements.

BRIEF DESCRIPTION OF THE DRAWINGS

The invention will now be described, by way of example, with reference to the accompanying drawings in which similar and/or comparable components carry the same reference numerals in which.

DETAILED DESCRIPTION OF THE INVENTION

Figure 1:
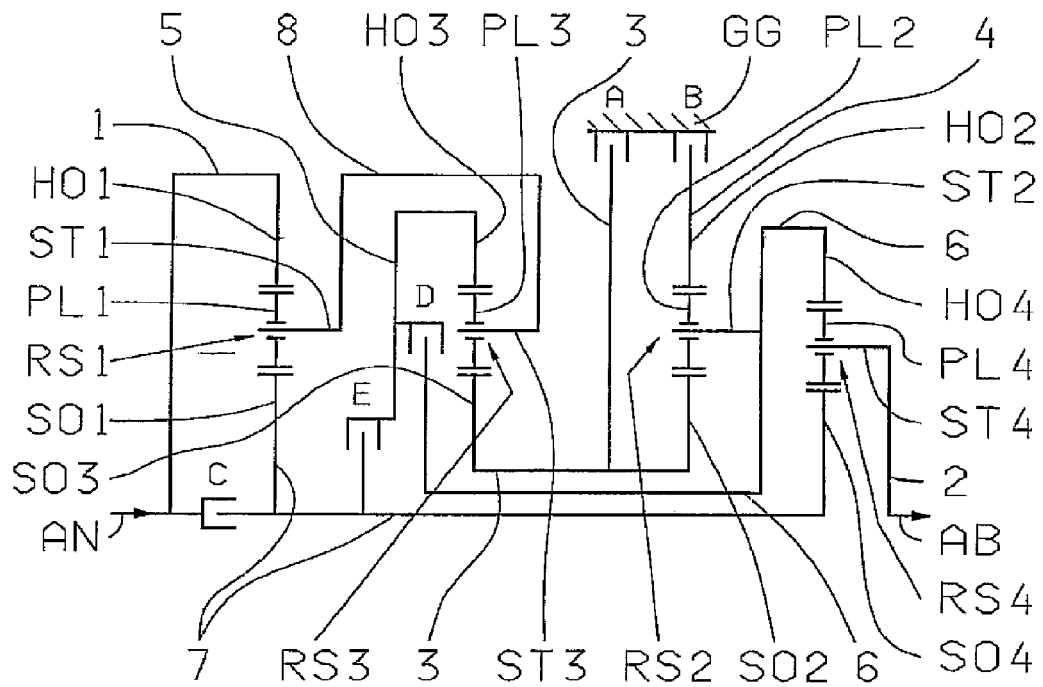
FIG. 1 is a schematic illustration of a first exemplary embodiment of a multi-step transmission according to the present invention.

FIG. 1 shows a first exemplary embodiment of a multi-step transmission according to the present invention. The transmission comprises one drive input shaft AN and one drive output shaft AB, as well as four planetary gearsets RS1, RS2, RS3, RS4 and five shift elements A, B, C, D, E, which are all arranged in one transmission housing GG. In this exemplary embodiment, all four planetary gearsets RS1, RS2, RS3, RS4 are designed as simple negative planetary gearsets and arranged co-axially one after the other in an axial direction in the sequential order of "RS1, RS3, RS2, RS4". As is generally known, a negative planetary gearset features planetary gears, which engage with the sun gear and gear of this planetary set. The internal gears of the planetary gearsets RS1, RS2, RS3 and RS4 are designated with HO1, HO2, HO3 and HO4, the sun gears as SO1, SO2, SO3 and SO4, planetary gears as PL1, PL2, PL3 and PL4, and the carriers, on which the planetary gears are mounted so as to rotate, as ST1, ST2, ST3 and ST4. The shift elements A and B are implemented as brakes, which in the illustrated exemplary embodiment can both be implemented as friction-locking shiftable multi-disk brakes, of course, in another embodiment also as a friction-locking shiftable band brake or also, for example, as a positive locking shiftable claw or cone brake. The shift elements C, D and E are implemented as clutches, which in the exemplary embodiment can all be implemented as a friction-locking shiftable multi-disk clutches, of course, in another embodiment, for example, also as positive locking claw or cone clutches.

With these five shift elements A to E, the selective shifting of eight forward gears and at least one reverse gear can be accomplished. The multi-step transmission according to the present invention incorporates a total of at least eight rotary shafts, which are designated with 1 to 8.

With respect to the coupling of the individual elements of the four planetary gearsets RS1, RS2, RS3, RS4 to each other and with the drive input shaft and drive output shaft AN, AB, the following is envisioned in the multi-step transmission according to FIG. 1: the gear HO1 of the first planetary gearset RS1 and the drive input shaft AN are connected in a rotationally fixed manner to one another and form the first transmission shaft. The carrier ST4 of the fourth planetary gearset RS4 and the drive output shaft AB are connected in a rotationally fixed manner to one another and form the second transmission shaft 2. The sun gears SO2, SO3 of the second and third planetary gearsets RS2, RS3 are connected in a rotationally fixed manner to one another and form the third transmission shaft 3. The gear HO2 of the second planetary gearset RS2 form the fourth shaft 4 and the gear HO3 of the third planetary gearset RS3 form the fifth transmission shaft 5. The carrier ST2 of the second planetary gearset RS2 and the gear HO4 of the fourth planetary gearset RS4 are connected in a rotationally fixed manner to one another and form the sixth transmission shaft 6. The sun gears SO1, SO4 of the first and fourth planetary gearset RS1, RS4 are connected in a rotationally fixed manner to one another and form the seventh transmission shaft 7. The carriers ST1, ST3 of the first and third planetary gearsets RS1, RS3 are connected in a rotationally fixed manner to one another and form the eighth transmission shaft 8.

With respect to the coupling of the five shift elements A to E at the described transmission shafts 1 to 8, the following is envisioned in the multi-step transmission according to FIG. 1: the first shift element A is placed in the flow of power between the third shaft 3 and the transmission housing GG. The second shift element B is arranged in the flow of power between the fourth shaft 4 and the transmission housing GG. The third shift element C is positioned in the flow of power between the first and seventh shaft 1, 7. The fourth shift element D is arranged in the flow of power between the fifth and sixth shaft 5, 6. The fifth shift element E is arranged in the flow of power between the fifth and seventh shaft 5, 7. By engaging the clutch C, the internal gear HO1 and sun gear SO1 of the first planetary gearset RS1 are connected to one another, resulting in the planetary gearset RS1 rotating as a group at the rotational speed of the drive input shaft, i.e., the sun gear SO1 and shaft 7 respectively as well as the carrier ST1 and shaft 8 respectively rotate at the rotational speed of the drive input shaft.

In the exemplary embodiment illustrated in FIG. 1, with the drive input shaft AN and drive output shaft AB are arranged, for example, co-axial to one another, the first planetary gearset RS1 is the gearset next to the input drive of the transmission and the fourth planetary gearset RS4 is the gearset next to the output drive of the transmission. It will be apparent to a person skilled in the art, that this transmission can be modified without special design and construction costs, so that the drive input shaft and drive output shaft are no longer arranged co-axial to one another, but are instead axially parallel or at an angle to one another. With an arrangement of this type, if necessary, the person skilled in the art will be able to arrange the input drive of the transmission next to the fourth planetary gearset RS4, namely on the side of the second planetary gearset RS1 facing away from the fourth planetary gearset RS4.

According to the layout of the four gearsets, viewed in the axial direction in the sequential order of "RS1, RS3, RS2, RS4", the seventh transmission shaft 7 extends in sections centrally inside the sixth shaft 6, and this sixth shaft 6 runs in sections centrically inside the third shaft 3. Further, the eighth shaft 8 completely encompasses the clutches E and D and the third planetary gearset RS3 in axial direction. The first transmission shaft 1 completely overlaps the clutch C in the axial and radial directions. The clutches D and E are arranged inside a cylindrical space formed by shaft 8, the clutch C inside a cylindrical space formed by shaft 1.

As is further apparent in the exemplary embodiment illustrated in FIG. 1, both brakes A, B, viewed spatially, can be arranged axially directly next to each other in an area above the planetary gearsets RS2 and RS3, whereby brake B is arranged at least in part radially above the second planetary gearset RS2, and whereby brake A is placed at least in part axially in an area between both planetary gearsets RS2 and RS3. In this exemplary embodiment, the kinematic connection of both brakes A, B to both planetary gearsets RS2 and RS3 causes brake A to be located closer to the first planetary gearset RS1 and/or closer to the input drive of the transmission than the brake B. Obviously, the layout of both brakes A, B, illustrated in FIG. 1, should be seen only as an example. Thus, the brake A, could be arranged at least in part radially above the third planetary gearset RS3. Depending on the available installation space for the transmission housing GG in the motor vehicle, another embodiment, for example, may provide that—based on the illustration in FIG. 1—both brakes A, B are arranged axially offset and parallel in a radial manner above the planetary gearsets RS2 and RS4 or radially parallel above the planetary gearsets RS1 and RS3.

As is still further apparent from FIG. 1, viewed spatially, the clutch C, via which the drive input shaft AN and shaft 1 respectively can be connected to shaft 7, is arranged on the side of the first planetary gearset RS1 facing away from the planetary gearset RS3, namely on the side of the transmission facing the drive motor of the transmission inside a cylindrical space formed by the shaft 1. In the illustrated example, the external disk carrier of the clutch C is connected in a rotationally fixed manner to the drive input shaft AN and the shaft 1 respectively. A servomechanism of the clutch C, not illustrated in detail in FIG. 1 for the sake of simplicity, preferably incorporating a dynamic pressure equalizer, can advantageously be mounted axially shiftable on the external disk carrier, rotating, in this case, constantly at the rotational speed of the drive input shaft. A pressurizing medium and lubricant supply to the clutch C can, for example, be accomplished in a simple constructive manner via central holes bored in the drive input shaft AN and/or shaft 7.

As is still further apparent from FIG. 1, viewed spatially, both clutches D and E are axially arranged in an area between both planetary gearsets RS1 and RS3, with the clutch D, for example, being arranged closer to the planetary gearset RS3 than the clutch E and also axially adjacent the planetary gearset RS3. In the illustrated example, the external disk carriers of both clutches D, E are connected to the shaft 5, and can be arranged in a simple constructive manner as a common disk carrier, which is then connected in a rotationally fixed manner to the internal gear HO3 of the third planetary gearset RS3. This common disk carrier may preferably accept the servomechanisms (not illustrated in detail in FIG. 1 for the sake of simplicity) of both clutches D, E axially shiftable, which then rotate constantly at the rotational speed of shaft 5, i.e., at the rotational speed of the gear HO3, manifesting an appropriate dynamic pressure equalization. Contrary to the illustration in FIG. 1, the disk sets of both clutches D, E can obviously be arranged axially parallel to one another.

Unlike the illustration in FIG. 1, a common disk carrier for both clutches D and E can, for example, be provided that is connected to the shaft 5 and is constructed as an internal disk carrier for the clutch E and as external disk carrier for the clutch D, whereby in this case, when viewed spatially, the disc carrier of clutch E is arranged at least in part above the disk set of the clutch D. Contrary to the illustration in FIG. 1, a common disk carrier can also be provided for both clutches D, E that is connected to the shaft 5 and is implemented as an internal disk carrier for the clutch D and as external disk set for the clutch E, whereby in this case, when viewed spatially, the disk set of the clutch D is placed at least in part above the disk set of the clutch E. Contrary to the illustration in FIG. 1, it can, for example, be provided that, when viewed spatially, the disk set of the clutch D is at least in part arranged radially in an area above the third planetary gearset RS3, whereby the disk set of the clutch E then is still closer to the first planetary gearset RS1 than the disk set of the clutch D, as in FIG. 1. Contrary to the illustration in FIG. 1, it may also be provided, for example, that the disk set of clutch E, viewed spatially, is at least in part radially arranged in an area above the third planetary gearset RS3, whereby in this case the disk set of clutch E, like FIG. 1, is arranged closer to the first planetary gearset RS1 than the disk set of the clutch D. Contrary to the depiction of FIG. 1 it can also be provided, that the disk set of clutch E, when viewed spatially, is positioned radially in the area at least partially above the third planetary gearset RS3 such that, in this case, then the disc set of clutch D—unlike in FIG. 1—is placed closer to the first planetary gearset RS1 than the disk set of clutch D and whereby, in this case, the shaft 5 is appropriately implemented as an internal disk carrier for both clutches D, E.

Figure 2:
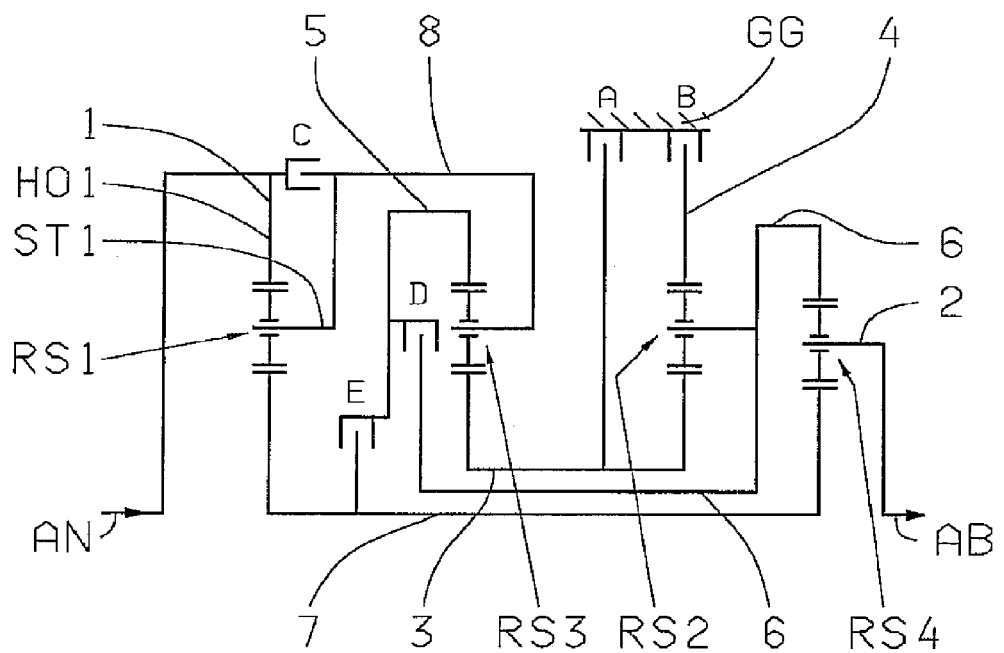
FIG. 2 is a schematic illustration of a second exemplary embodiment of a multi-step transmission according to the present invention.

FIG. 2 shows a second embodiment of a multi-step transmission based on the first exemplary embodiment described above in detail on the basis of FIG. 1. As it may easily seen in FIG. 2, the kinematic coupling of the four planetary gearsets RS1, RS2, RS3, RS4 with one another and with the four shift elements A, B, D, E and the drive input shaft AN and drive output shaft AB is identical to FIG. 1, however the kinematic coupling of the clutch C is different from FIG. 1. As is apparent from FIG. 2, the drive input shaft AN and transmission shaft 1 can henceforth be connected to the transmission shaft 8 via the clutch C.

By engaging the clutch C, the gear HO1 and carrier ST1 of the planetary gearset RS1 are henceforth connected to one another. As in FIG. 1, the planetary gearset RS1 rotates as a group at the rotational speed of the drive input shaft, when the clutch C is engaged. As in FIG. 1, when the clutch C is engaged, the sun gear SO1 and the shaft 7 respectively as well as the carrier ST1 and the shaft 8 respectively rotate at the rotational speed of the drive input shaft.

According to the kinematic coupling of the clutch C to the shafts 1 and 8, the spatial layout of the clutch in FIG. 2 is different compared to FIG. 1. As is apparent from FIG. 2, when viewed spatially, at least the disk set of the clutch C is arranged axially between the first planetary gearset RS1 and third planetary gearset RS3, and is directly axial adjacent to the first planetary gearset RS1, in this case, for example, on a diameter larger than the gear HO1. The element of the clutch C connected to the shaft 1 is constructed as an external disk carrier. A servomechanism (not illustrated in detail in FIG. 2 for the sake of simplicity) of clutch C in order to actuate its disk set can be primarily placed on the side of the shaft 1 facing away from the first planetary gearset RS1, and mounted in an axially shiftable manner on the drive input shaft AN and shaft 1 respectively, and rotates constantly at the rotational speed of the drive input shaft, whereby an activation element of this servomechanism acting on the disk set of the clutch C encompasses the first planetary gearset RS1 and disk set of the clutch C in an axial and radial direction, and acts on the allocated disk set from the side of the disk set of the clutch C, which faces the third planetary gearset RS3.

In a further embodiment of the clutch C, it may, however, be provided, that its internal disk carrier is connected to the shaft 1, and its external disk carrier is connected to the shaft 8. In this case, when viewed spatially, the servomechanism of the clutch C (not illustrated in detail in FIG. 2 for the sake of simplicity) is placed at least substantially on the side of the allocated disk set of the clutch C which faces away from the first planetary gearset RS1 inside a cylindrical space formed by the shaft 8, mounted in an axially displaceable manner on this shaft 8 and accordingly rotating constantly at the rotational speed of shaft 8.

As is still further apparent from FIG. 2, the spatial layout of the transmission components in relation to one another has been taken unchanged from FIG. 1, except for the spatial location of clutch C. Compared to FIG. 1, the arrangement details according to FIG. 2 should be seen as exemplary details. The expert will be able, if necessary, to correspondingly transfer all considerations regarding the layout of the components of the transmission in the transmission housing GG to the gearset design according to FIG. 2.

Figures 3, 4:
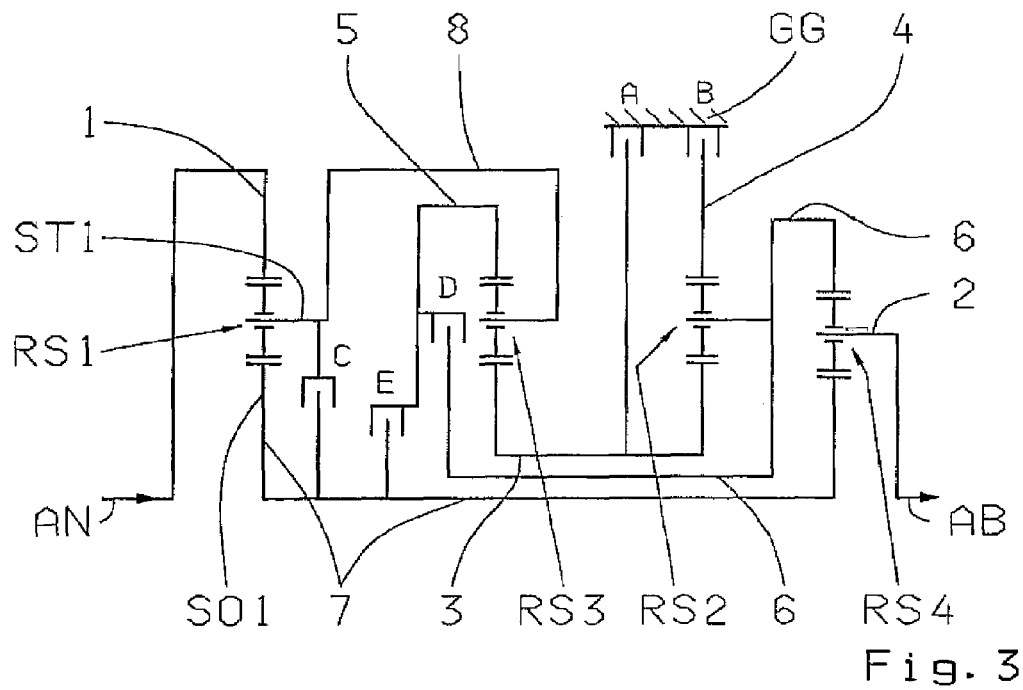
FIG. 3 is a schematic diagram of a third exemplary embodiment of a multi-step transmission according to the present invention.
FIG. 4 is an exemplary gear shift pattern for the multi-step transmission according to FIGS. 1, 2 and 3.

FIG. 3 shows a third embodiment of a multi-step transmission, again based on the first embodiment described above in detail on the basis of FIG. 1. As may easily seen in FIG. 3, the kinematic coupling of the four planetary gearsets RS1, RS2, RS3 and RS4 with one another and with the four shift elements A, B, D, E and with the drive input shaft AN and drive output shaft AB is totally identical to FIG. 1, however the kinematic coupling of the clutch C is different from FIG. 1. As is apparent from FIG. 3, the transmission shafts 7 and 8 may henceforth be connected to one another via the clutch C.

By engaging the clutch C, the sun gear SO1 and carrier ST1 of the first planetary gearset RS1 are henceforth connected to one another. Like in FIG. 1, the planetary gearset RS1 rotates as a group at the rotational speed of the drive input shaft, when clutch C is engaged. As in FIG. 1, the sun gear SO1 and the shaft 7 respectively, as well as the carrier ST1 and the shaft 8 respectively rotate at the rotational speed of the drive input shaft when the clutch C is engaged.

As is still further apparent from FIG. 3, except for the spatial location of the clutch C, the layout of the transmission components in relation to one another is the same as that of FIG. 1. Compared to FIG. 1, the arrangement details according to FIG. 3 should be seen as exemplary. An expert will consequently be able to correspondingly transfer, if necessary, all considerations regarding the layout of the transmission components in the transmission housing GG to the gearset arrangement according to FIG. 3.

According to the kinematic coupling of the clutch C to the shafts 1 and 8, the layout of the clutch in FIG. 3 is different from FIG. 1. As is apparent from FIG. 2, viewed spatially, the clutch C is henceforth arranged axially between the first planetary gearset RS1 and third planetary gearset RS3 and axially between the first planetary gearset RS1 and the clutch E respectively. The clutch C is axially adjacent the first planetary gearset RS1, in this case, radially in an area below the carrier ST1 of this planetary gearset RS1. The element of clutch C connected in a torsion-proof manner with this carrier ST1 is constructed as an external disk carrier in the illustrated example, however, can obviously also be implemented as an internal disk carrier. A servomechanism for the operation of the disk set of clutch C, not illustrated in detail in FIG. 3 for the sake of simplicity, can be positioned in a simple constructive manner on the side of the disk set of the clutch C facing the first planetary gearset RS1 or on the side facing away from the disk set of the clutch C.

Unlike the illustration in FIG. 3, the disk set of clutch C can, for example, be arranged radially, when viewed spatially and in order to save construction length, in an area above the disk set of the clutch E, or radially in an area above the disk set of the clutch D, or radially in an area above the third planetary gearset RS3.

FIG. 4 shows an exemplary shift pattern of the multi-step transmission of this invention according to FIG. 1, FIG. 2 and FIG. 3. In each gear, three shift elements are engaged and two shift elements are disengaged. Apart from the gear shift logic, exemplary values for the respective ratios i of the individual gears and the progressive ratios φ resulting therefrom can be obtained from the gear shift pattern. The indicated ratios i result from the (typical) stationary transmission ratios of the four planetary gearsets RS1, RS2, RS3, RS4 of negative 1.55, negative 2.06, negative 3.54 and negative 3.70. Further, the shift pattern allows, that during sequential shifting double shifts and/or range shifts are avoided because two gear ratios adjacent in the gear shift logic use two common shift elements. The sixth gear is designed as a direct gear.

The first forward gear results from engaging the brakes A and B and clutch C, the second forward gear from engaging the brakes A and B and clutch E, the third forward gear from engaging the brake B and clutches C and E, the fourth forward gear from engaging the brake B and clutches D and E, the fifth forward gear from engaging the brake B and clutches C and D, the sixth forward gear from engaging the clutches C, D and E, the seventh forward gear from engaging the brake A and clutches C and D, and the eighth forward gear from engaging the brake A and clutches D and E. As is further apparent from the shift pattern, the reverse gear results from engaging the brakes A and B and clutch D.

According to the present invention, starting the vehicle is possible via a shift element integrated in the transmission. For this purpose, a shift element is particularly suitable, if it is required in the first forward gear as well as in the reverse gear, such as brake A or brake B. Both of these brakes A and B are also advantageously required in the second forward gear. If the brake B is used as a starting element integrated in the transmission, starting is even possible in the first five forward gears and reverse gear.

In principle, the spatial layout of the shift elements of the variant of a multi-step transmission according to the present invention inside the transmission illustrated in FIGS. 1 to 3 can be as desired and is only limited by the dimensions and external shape of the transmission housing GG. For instance, FIG. 5 accordingly illustrates a component layout variant of the multi-step transmission according to FIG. 1, whereby all kinematic couplings of the gearset elements, shift elements and shafts have been transferred without modifications among one another from FIG. 1.

Figure 5:
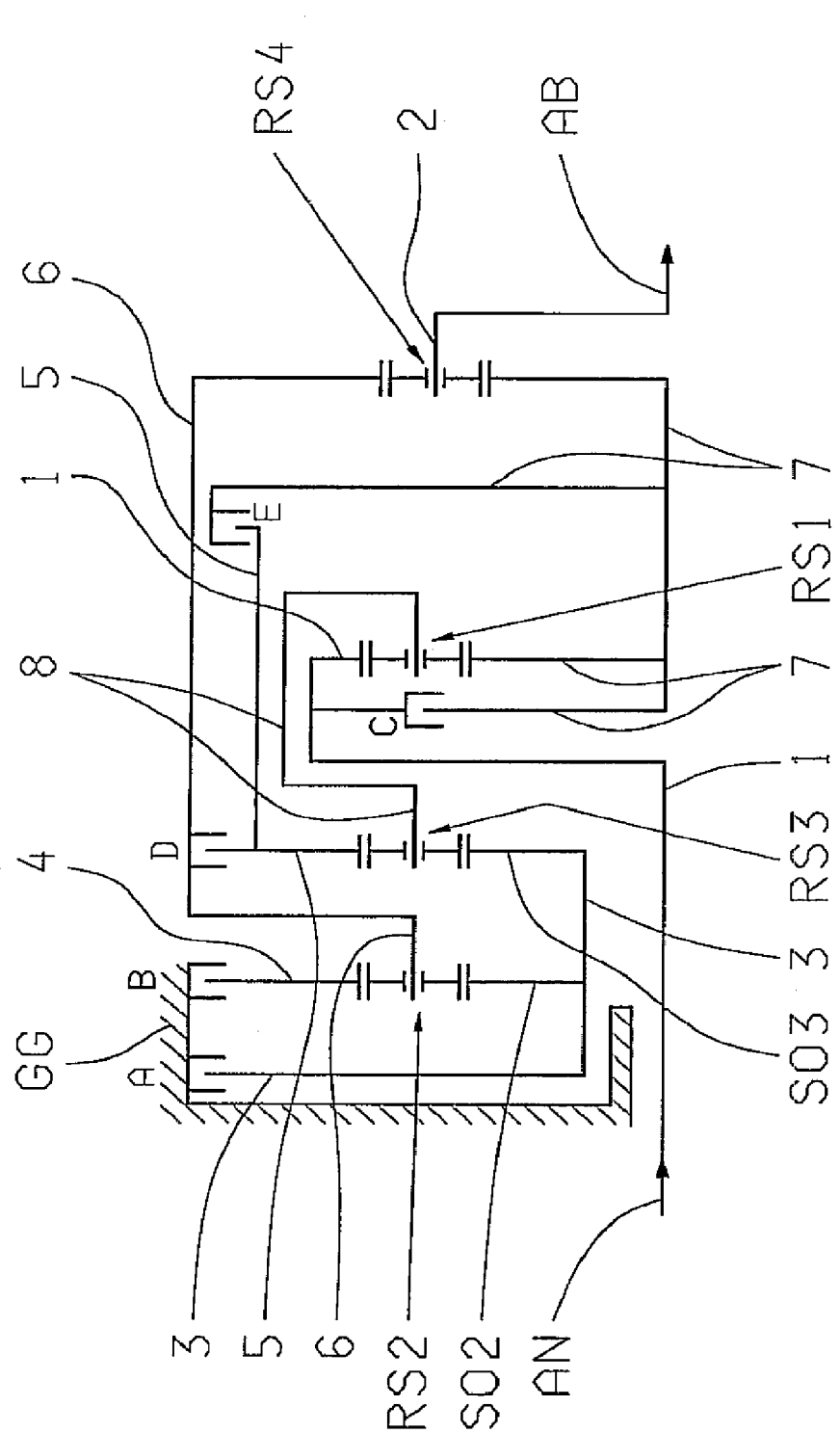
FIG. 5 is an exemplary component layout variant for the multi-step transmission according to FIG. 1.

As is apparent from FIG. 5, the four planetary gearsets RS1 to RS4 are hereafter co-axially arranged in the sequential order of "RS2, RS3, RS1, RS4". As in FIG. 1, the drive input shaft AN and drive output shaft AB, for example, are arranged co-axial to one another, so that the second planetary gearset RS2 is the transmission gearset next to the input drive, whereby the fourth planetary gearset RS4, like in FIG. 1, is the transmission gearset next to the output drive. Naturally, the considerations made within the scope of the description of FIG. 1 regarding the possibilities of the relative spatial location of the drive input shaft AN and drive output shaft AB and the transmission input and output respectively can correspondingly be transferred to the example in FIG. 5.

According to the spatial layout of the four gearsets, viewed in the axial direction in the sequential order of "RS2, RS3, RS1, RS4", the four planetary gearsets RS1 to RS4 are each at most control passed through by one shaft. As is apparent from FIG. 5, with respect to the exemplary spatial location of the input drive, both planetary gearsets RS2, RS3 are only centrally passed through in an axial direction by the drive input shaft AN and transmission shaft 1 respectively on the side of the second planetary gearset RS2 opposite the third planetary gearset RS3, the other two planetary gearsets RS1 and RS4 are not passed through by any shaft. This is particularly advantageous, on the one hand, for dimensioning the drive input shaft AN and the gearsets, on the other hand, for the comparatively easy lubrication of the planetary gearsets RS1, RS2, RS3, RS4 and for the comparatively easy supply of pressurizing medium and lubricant to the three clutches E, D and C. This shaft 3, which, as is generally known, forms the connection to both sun gears SO2, SO3 of the planetary gearsets RS2, RS3, can be mounted so as to rotate on the drive input shaft AN or also on a hub arranged fast on the transmission housing in a simple constructive manner. If, differing from FIG. 5, in another embodiment with a non-co-axial drive input shaft and drive output shaft, the transmission input drive is arranged on the side of the fourth planetary gearset RS4 opposite the planetary gearset RS1, both planetary gearsets RS4 and RS1 are centrally passed through by the drive input shaft AN and shaft 1 respectively in an axial direction, and the other two planetary gearsets RS3 and RS2 by no shaft at all.

In keeping with the spatial location of the four planetary gearsets RS1 to RS4 relative to each other and differing from FIG. 1, FIG. 5 shows a useful spatial arrangement of the five shift elements A to E within the transmission housing GG relative to the gearsets which differs from FIG. 1.

As is apparent from FIG. 5 when viewed spatially, the brake B, in particular the disk set of brake B, is arranged radially in an area above the second planetary gearset RS2. In the illustrated exemplary embodiment, brake A connects axially to brake B, whereby the multi-disk sets of both these brakes A, B are arranged on an at least similar diameter. According to the spatial location of the second planetary gearset RS2 in the area of a radial external wall of the transmission housing GG, both brakes A and B are arranged next to this wall of the transmission housing, whereby in the illustrated exemplary embodiment, brake A borders directly on this wall of the transmission housing. In the illustrated exemplary embodiment, the wall of the transmission housing is arranged on the external wall of the transmission facing the drive engine of the transmission according to the exemplary co-axial arrangement of the drive input shaft and drive output shaft AN, AB and the corresponding spatial layout of the drive input on the side of the transmission housing GG, on which the second planetary gearset RS2 is also arranged. Unlike the illustration in FIG. 5, the brakes A, B can at least basically be arranged radially one above the other in the area of the housing wall, whereby brake B, when viewed spatially, is positioned above brake A. In still another configuration, based on the illustration of FIG., both brakes A, B can also be arranged offset in the direction of the center of the transmission, in particular such, that the brake A is at least in part arranged radially in an area above the planetary gearset RS2, and brake B is arranged at least in part in an area above the planetary gearset RS3. The servomechanisms of brakes A, B (not illustrated in detail in FIG. 5 for the sake of simplicity) for the operation of the respectively allocated disk set of brakes A and B respectively can be integrated in a simple constructive manner in the transmission housing and/or the wall (in this case, by way of example, close to the input drive) of the transmission housing.

The clutch C, via which the drive input shaft AN and shaft 1 respectively can be connected to the shaft 7, when viewed spatially, is arranged axially between the first and third planetary gearsets RS1, RS3, directly axially adjacent with the first planetary gearset RS1. In the illustrated example, the external disk carrier of the clutch C is connected in a rotationally fixed manner to the drive input shaft AN and shaft 1 respectively. Thus, the clutch C is arranged inside a space formed by shaft 1. A servomechanism (not illustrated in detail in FIG. 5 for the sake of simplicity) of clutch C can advantageously be mounted axially shiftable on this external disk carrier, in this case rotating constantly at the rotational speed of the drive input shaft. A pressurizing medium and lubricant supply to the clutch C can, for example, be accomplished via corresponding bored holes and canals with respect to the drive input shaft AN. Differing from FIG. 5 it may, however, also be provided, that the external disk carrier of clutch C is correspondingly connected to the shaft 7 and the internal disk carrier of clutch C respectively connected to the shaft 1. In this case, the servomechanism of clutch C is then appropriately mounted to be axially shiftable on shaft 7 to rotate constantly at the rotational speed of this shaft 7. The pressurizing medium supply to clutch C is appropriately accomplished via corresponding bored holes and canals of shaft 7 respectively.

In the embodiment illustrated in FIG. 5, the clutch E connected to the transmission shaft 5, when viewed spatially, is arranged axially in an area between both planetary gearsets RS1 and RS4, whereby the element of clutch E connected in a rotationally fixed manner to the shaft 5 is constructed, for example, as an internal disk carrier and the element of clutch E connected to the transmission shaft 7 accordingly is constructed as an external disk carrier. In this case, it is accordingly appropriate, that the servomechanism (not illustrated in detail in FIG. 5 for the sake of simplicity) for the operation of the disk set of clutch E is mounted, axially shiftable, on shaft 7 rotating constantly at the rotational speed of this shaft 7. Preferably, the servomechanism of clutch E axially borders the first planetary gearset RS1. Contrary to the diagram in FIG. 5, in order to save axial installation length, when viewed spatially, the disk set of clutch E can, for example, also be arranged at least in part radially in an area above the first planetary gearset RS1, whereby the servomechanism of clutch E predominantly still axially borders on the planetary gearset RS1.

As is still further apparent from FIG. 5, when viewed spatially, the disk set of clutch D is arranged radially in an area above the third planetary gearset RS3, with the internal disk carrier of this clutch D is in this case connected, for example, to the transmission shaft 5, and the external disk carrier of clutch D is correspondingly connected in a rotationally fixed manner to the transmission shaft 6. In this case, it is accordingly appropriate, that the servomechanism (not illustrated in detail in FIG. 5 for the sake of simplicity) for the operation of the disk set of clutch D is mounted axially shiftable on shaft 6 enabling it to rotate constantly at the rotational speed of this shaft 6. Depending on the requirements, the servomechanism of clutch D can either be arranged on the side of the allocated disk set facing the second planetary gearset RS2, or on the side of the allocated disk set facing the fourth planetary gearset RS4. In the first case, the servomechanism of clutch D is predominantly arranged axially in an area between the planetary gearsets RS2 and RS3, and can be supplied with pressurizing medium and lubricant via corresponding bored holes and canals of the drive input shaft AN and (sun) shaft 3 respectively. In the second case, the servomechanism of clutch D is at least predominantly axially arranged in an area between the radial section of shaft 7 forming the external disk carrier of clutch E and the planetary gearset RS4, and can be supplied with pressurizing medium and lubricant via corresponding bored holes and canals of the (sun) shaft 7 respectively in a simple constructive manner, whereby an element of this servomechanism acts on the disk set of clutch E overlapping the clutch E and the first planetary gearset RS1 radially in axial direction.

From the spatial layout of the four gearsets viewed in axial direction in the sequential order of "RS2, RS3, RS1, RS4", the transmission shaft 5 extends inside the cylindrical space of the transmission shaft 6, the transmission shaft 8 extends at least to a large extent inside the cylindrical space of this shaft 5, and a section of the transmission shaft 1 runs inside the cylindrical space of this shaft 8. The transmission shaft 7 also predominantly runs radially inside the cylindrical space of shaft 6. A cylindrical section of shaft 1 radially overlaps clutch C in axial direction, shaft 5 likewise radially overlaps clutch C and the first planetary gearset RS1 at least to a large extent in axial direction, and shaft 6 finally radially overlaps clutch C and the first planetary gearset RS1 and clutch E in axial direction.

On the basis of the component layout variant described FIG. 5, the expert will obviously be able to appropriately transfer the gearset pattern and the kinematic coupling of the components of the multi-step transmission according to FIG. 1 to the other gearset patterns according to FIG. 2 and FIG. 3. With respect to the gearset pattern and kinematic coupling of the components respectively according to FIG. 2, unlike FIG. 5, brake C, which in this case forms a shiftable connection between the first and eighth transmission shafts 1, 8, would border directly with the third planetary gearset RS3. Regarding the gearset pattern and kinematic coupling of the components according to FIG. 3, brake C, which in this case forms a shiftable connection between the seventh and eighth transmission shafts 7, 8, unlike FIG. 5, would be arranged on the side of the first planetary gearset RS1 facing the fourth planetary gearset RS4, directly bordering appropriately with the first planetary gearset RS1.

Furthermore, the following applies to all previously illustrated and described exemplary embodiments of the transmission family according to the present invention.

According to the present invention, depending on the stationary transmission ratio of the individual planetary gearsets, different gear transitions can be obtained with the same transmission pattern, so that custom-designed and/or vehicle-specific variations are possible.

Figure 11:
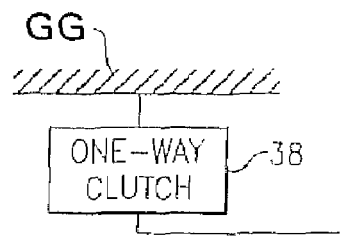
FIG. 11 is a diagrammatic view of a multi-speed transmission having a one-way clutch.

It is besides possible, as shown in FIG. 11, to provide an additional one-way clutch 38 at each suitable point of the multi-step transmission, for example, between a shaft and housing or, if necessary, to connect two shafts.

Figure 6:
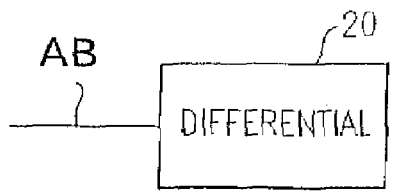
FIG. 6 is a diagrammatic view of a multi-speed transmission with a differential.

A differential and/or transfer differential 20 can be arranged on the drive input side or drive output side according to the present invention, as shown in FIG. 6.

Figure 7:
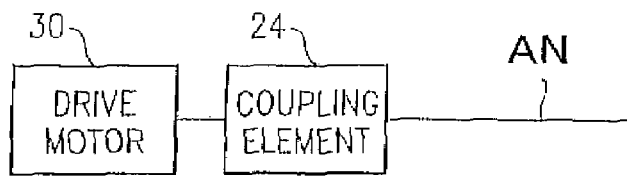
FIG. 7 is a diagrammatic view of a multi-speed transmission with a coupling element and a drive motor.
Figure 8:
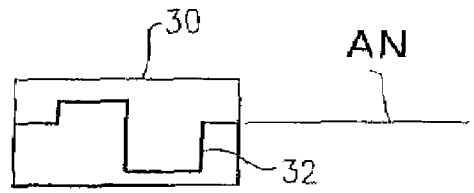
FIG. 8 is a diagrammatic view of a multi-speed transmission with a crankshaft of the drive motor fixed to an input shaft of the multi-speed transmission.
Figure 15:
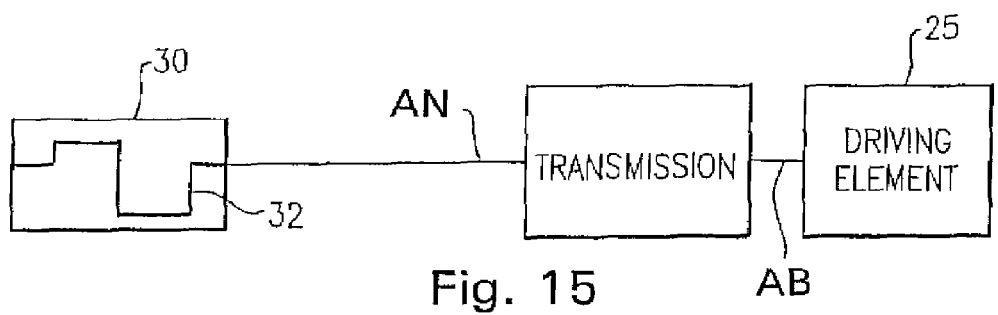
FIG. 15 is a diagrammatic view of a multi-speed transmission with the crankshaft of the drive motor fixed to the input shaft of the multi-speed transmission and the coupling element located behind the multi-speed transmission.

In the context of an advantageous improvement, shown in FIG. 7, the drive input shaft AN can be separated from a drive motor 30 by a coupling element 24, if required, whereby a hydrodynamic converter, hydraulic clutch, dry start clutch, wet start clutch, magnetic powder clutch or centrifugal clutch can be used. A driving element 25 of this type can also be arranged behind, as shown in FIG. 15, the transmission in the flow of power, the drive input shaft AN being connected constantly with the crankshaft of the drive motor, as shown in FIG. 8.

Figure 9:
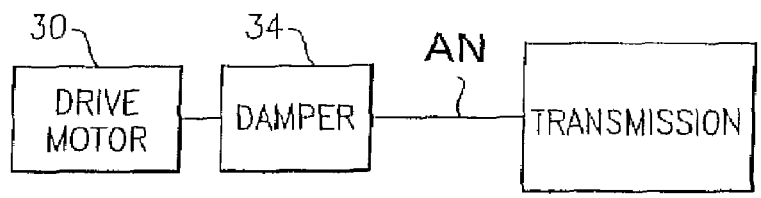
FIG. 9 is a diagrammatic view of a multi-speed transmission having the drive motor communicating with a damper.

The multi-step transmission according to the present invention, as shown in FIG. 9, also makes the arrangement of a torsion vibration damper 34 between the drive motor 30 and the transmission possible.

Figure 10:
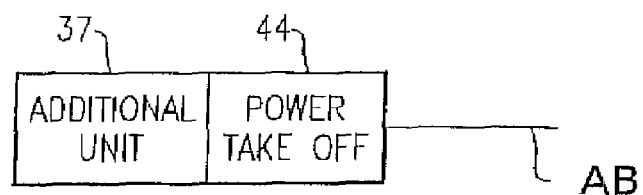
FIG. 10 is a diagrammatic view of a multi-speed transmission with a power take-off for driving an additional unit.
Figure 13:
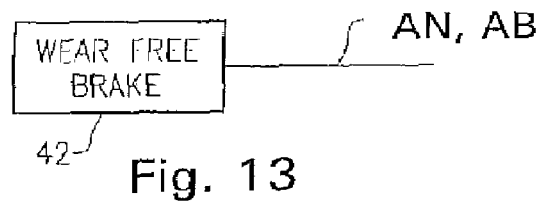
FIG. 13 is a diagrammatic view of a multi-speed transmission having a wear free brake.
Figure 14:
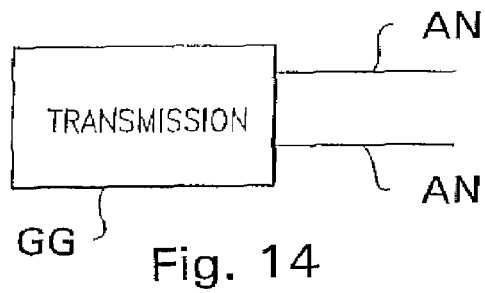
FIG. 14 is a diagrammatic view of the invention with the input and the output being provided on the same side of the multi-speed transmission housing.

In the context of another embodiment of the present invention, shown in FIG. 13, a wear-free brake 42, e.g., a hydraulic or electric retarder or a similar device, can be arranged on the drive input shaft AN or the drive output shaft AB, which is particularly important for the use in commercial vehicles. Moreover, a power take off 44 can be provided to drive an additional unit(s) 37 on each shaft, preferably on the drive input shaft AN or the drive output shaft AB, as shown in FIG. 10. Additionally, as shown in FIG. 14, the input and the output are provided on the same side of the housing GG.

The shift elements used can be designed as power-shift clutches or brakes. In particular, friction-locked clutches or brakes, like multi-disk clutches, band brakes and/or cone clutches can be used. Additionally, friction-locked brakes and/or clutches, like synchronizations or claw clutches may also be used as shift elements. For brake B in particular, the use of a band brake that may save installation length is an alternative because, according to the shift logic of the transmission, this brake B is only shifted when engaging the reverse gear from the neutral position and shifting back to the fifth forward gear.

Figure 12:
FIG. 12 is a diagrammatic view of a multi-speed transmission with an electric machine.

A further advantage of the present multi-step transmission, as shown in FIG. 12, is that an electric machine 40 can additionally be installed on each shaft as a generator and/or additional drive machine.

Obviously, any constructive embodiment, particularly any layout of the components of the planetary gearsets and shift elements as such, as well as in relation to one another, to the extent they are technically expedient, falls under the scope of protection of the present claims, without influencing the function of the transmission as described in the claims, even if these embodiments are not explicitly illustrated in the Figures or mentioned in the description.

| Reference numerals | |
|---|---|
| 1 | first shaft |
| 2 | second shaft |
| 3 | third shaft |
| 4 | fourth shaft |
| 5 | fifth shaft |
| 6 | sixth shaft |
| 7 | seventh shaft |
| 8 | eighth shaft |
| A | first shift element, first brake |
| B | second shift element, second brake |
| C | third shift element, first clutch |
| D | fourth shift element, second clutch |
| E | fifth shift element, third clutch |
| AN | drive input shaft |
| AB | drive output shaft |
| GG | housing |
| RS1 | first planetary gearset |
| HO1 | gear of the first planetary gearset |
| SO1 | sun gear of the first planetary gearset |
| ST1 | carrier of the first planetary gearset |
| PL1 | planetary gears of the first planetary gearset |
| RS2 | second planetary gearset |
| HO2 | gear of the second planetary gearset |
| SO2 | sun gear of the second planetary gearset |
| ST2 | carrier of the second planetary gearset |
| PL2 | planetary gears of the second planetary gearset |
| RS3 | third planetary gearset |
| HO3 | gear of the third planetary gearset |
| SO3 | sun gear of the third planetary gearset |
| ST3 | carrier of the third planetary gearset |
| PL3 | planetary gears of the third planetary gearset |
| PS4 | fourth planetary gearset |
| HO4 | gear of the fourth planetary gearset |
| SO4 | sun gear of the fourth planetary gearset |
| ST4 | carrier of the fourth planetary gearset |
| PL4 | planetary gears of the fourth planetary gearset |
| i | ratio |
| φ | progressive ratio |

The invention claimed is:

1. A automatic multi-speed transmission of a planetary design for a motor vehicle, the transmission comprising:

a drive input shaft (AN) and a drive output shaft (AB);

first, second, third and fourth planetary gearsets (RS1, RS2, RS3, RS4), and each of the first planetary gearset (RS1), the second planetary gearset (RS2), the third planetary gearset (RS3), and the fourth planetary gearset (RS4) comprising a sun gear, a carrier and a ring gear;

at least first, second, third, fourth, fifth, sixth, seventh and eighth rotary shafts (1, 2, 3, 4, 5, 6, 7, 8) and first, second, third, fourth, and fifth shift elements (A, B, C, D, E), whose selective engagement creates different transmission ratios between the drive input shaft (AN) and the drive output shaft (AB) so that eight forward gears and one reverse gear can be implemented;

wherein the ring gear (HO1) of the first planetary gearset (RS1) and the drive input shaft (AN) are coupled in a rotationally fixed manner and form the first shaft (1);

the carrier (ST4) of the fourth planetary gearset (RS4) and the drive output shaft (AB) are coupled in a rotationally fixed manner and form the second shaft (2);

the sun gear (SO2) of the second planetary gearset (RS2) and the sun gear (SO3) of the third planetary gearset (RS3) are coupled in a rotationally fixed manner and form the third shaft (3);

the ring gear (HO2) of the second planetary gearset (RS2) forms the fourth shaft (4);

the ring gear (HO3) of the third planetary gearset (RS3) forms the fifth shaft (5);

the carrier (ST2) of the second planetary gearset (RS2) and the ring gear (HO4) of the fourth planetary gearset (RS4) are coupled in a rotationally fixed manner and form the sixth shaft (6);

the sun gear (SO1) of the first planetary gearset (RS1) and the sun gear (S04) of the fourth planetary gearset (RS4) are coupled in a rotationally fixed manner and form the seventh shaft (7);

the carrier (ST1) of the first planetary gearset (RS1) and the carrier (ST3) of the third planetary gearset (RS3) are coupled in a rotationally fixed manner and form the eighth shaft (8);

the first shift element (A) is arranged between the third shaft (3) and a transmission housing (GG);

the second shift element (B) is arranged between the fourth shaft (4) and the transmission housing (GG);

the third shift element (C) is arranged in a flow of power between one of the first shaft (1) and the seventh shaft (7), the first shaft (1) and the eighth shaft (8), and the seventh shaft (7) and the eighth shaft (8);

the fourth shift element (D) is arranged in the flow of power between the fifth shaft (5) and the sixth shaft (6); and the fifth shift element (E) is arranged in the flow of power between the fifth shaft (5) and the seventh shaft (7).

2. The multi-speed transmission according to claim 1, wherein a first forward gear results from engagement of the first shift element (A), the second shift element (B) and the third shift element (C);

a second forward gear results from engagement of the first shift element (A), the second shift element (B) and the fifth shift element (E);

a third forward gear results from engagement of the second shift element (B), the third shift element (C) and the fifth shift element (E);

a fourth forward gear results from engagement of the second shift element (B), the fourth shift element(D) and the fifth shift element (E);

a fifth forward gear results from engagement of the second shift element (B), the third shift element (C) and the fourth shift element (D);

a sixth forward gear results from engagement of the third shift element (C), the fourth shift element (D) and the fifth shift element (E);

a seventh forward gear results from engagement of the first shift element (A), the third shift element (C) and the fourth shift element (D); and an eighth forward gear results from engagement of the first shift element (A), the fourth shift element (D) and the fifth shift element (E).

3. The multi-speed transmission according to claim 1, wherein the reverse gear results from engagement of the first shift element (A), the second shift element (B) and the fourth shift element (D).

4. The multi-speed transmission according to claim 1, wherein the first planetary gearset (RS1), the second planetary gearset (RS2), the third planetary gearset (RS3), and the fourth planetary gearset (RS4) are designed as negative planetary gearsets.

5. The multi-speed transmission according to claim 1, wherein the first planetary gearset (RS1), the second planetary gearset (RS2), the third planetary gearset (RS3), and the fourth planetary gearset (RS4) are coaxially arranged in a sequential order of:

the first planetary gearset (RS1), the third planetary gearset (RS3), the second planetary gearset (RS2), and the fourth planetary gearset (RS4).

6. The multi-speed transmission according to claim 5, wherein the seventh shaft (7) axially passes through in sections centrically inside the sixth shaft (6);

the sixth shaft (6) axially passes through in sections centrically inside the third shaft (3), and the eighth shaft (8) completely axially encompasses the fifth shaft (5), the fourth shift element (D), the fifth shift element (E) and the third planetary gearset (RS3).

7. The multi-speed transmission according to claim 6, wherein when viewed with respect to a spacial layout, the first shift element (A) and the second shift element (B) are arranged axially directly adjacent and radially about the first planetary gearset (RS1), the second planetary gearset (RS2), the third planetary gearset (RS3), and the fourth planetary gearset (RS4).

8. The multi-speed transmission according to claim 6, wherein when viewed with respect to a spacial layout, the second shift element (B) is at least partially radially arranged about the second planetary gearset (RS2), and the first shift element (A) is at least one of arranged axially at least partially between the second planetary gearset (RS2) and the third planetary gearset (RS3) and radially at least partially above the third planetary gearset (RS3).

9. The multi-speed transmission according to claim 1, wherein when viewed with respect to a spacial layout, the fourth shift element (D) and the fifth shift element (E) are at least partially axially located between the first planetary gearset (RS1) and the third planetary gearset (RS3).

10. The multi-speed transmission according to claim 1, wherein the first shaft (1) completely surrounds, both in an axial direction and a radial direction, the third shift element (C).

11. The multi-speed transmission according to claim 1, wherein when viewed with respect to a spacial layout, the third shift element (C) is located on a side of the first planetary gearset (RS1) opposite the third planetary gearset (RS3).

12. The multi-speed transmission according to claim 1, wherein the eighth shaft (8) completely surrounds, both in an axial direction and a radial direction, the third shift element (C).

13. The multi-speed transmission according to claim 1, wherein the first planetary gearset (RS1), the second planetary gearset (RS2), the third planetary gearset (RS3), and the fourth planetary gearset (RS4) are coaxially arranged in a sequential order of:

the second planetary gearset (RS2), the third planetary gearset (RS3), the first planetary gearset (RS1) and the fourth planetary gearset (RS4).

14. The multi-speed transmission according to claim 1, wherein the first planetary gearset (RS1), the second planetary gearset (RS2), the third planetary gearset (RS3), and the fourth planetary gearset (RS4) are axially centrically passed through, at a time, by at most one of the input shaft (AN), the output shaft (AB), the first rotary shaft (1), the second rotary shaft (2), the third rotary shaft (3), the fourth rotary shaft (4), the fifth rotary shaft (5), the sixth rotary shaft (6), the seventh rotary shaft (7) and the eighth rotary shaft (8).

15. The multi-speed transmission according to claim 14, wherein the first planetary gearset (RS1), the second planetary gearset (RS2), the third planetary gearset (RS3), and the fourth planetary gearset (RS4) are coaxially arranged in a sequential order of:

the first planetary gearset (RS1), the third planetary gearset (RS3), the second planetary gearset (RS2) and the fourth planetary gearset (RS4).

16. The multi-speed transmission according to claim 1, wherein the drive input shaft (AN) and the first transmission shaft (1) respectively axially centrically overlap the fourth planetary gearset (RS4) and the first planetary gearset (RS1).

17. The multi-speed transmission according to claim 1, wherein the eighth shaft(8) completely surrounds, in an axial direction and a radial direction, the third shift element (C) and the first planetary gearset (RS1);

the fifth shaft (5) completely surrounds, in an axial direction and a radial direction, the eighth shaft (8); and the sixth shaft (6) completely surrounds, in an axial direction and a radial direction, the third planetary gearset (RS3), the fifth shaft (5) and the fifth shift element (E).

18. The multi-speed transmission according to claim 1, wherein the third shaft (3) is rotationally supported on one of the drive input shaft (AN) and a hub fixed the transmission housing (GG).

19. The multi-speed transmission according to claim 1, wherein when viewed with respect to a spacial layout, the second shift element (B) is radially arranged at least partially about the second planetary gearset (RS2), and the first shift element (A) is axially arranged on a side of the second planetary gearset (RS2) opposite the third planetary gearset (RS3).

20. The multi-speed transmission according to claim 1, wherein when viewed with respect to a spacial layout, the first shift element (A) and the second shift element (B) are axially arranged directly adjacent one another.

21. The multi-speed transmission according to claim 1, wherein one of the first shift element (A) is radially arranged essentially about the second shift element (B) and the second shift element (B) is radially arranged essentially about the first shift element (A).

22. The multi-speed transmission according to claim 1, wherein the fourth shift element (D) is axially arranged on a side of the first planetary gearset (RS1) opposite the fourth planetary gearset (RS4), and the fifth shift element (E) is axially arranged on a side of the first planetary gearset (RS1) opposite the third planetary gearset (RS3).

23. The multi-speed transmission according to claim 1, wherein when viewed with respect to a spacial layout, the fifth shift element (E) is axially arranged between the first planetary gearset (RS1) and the fourth planetary gearset (RS4).

24. The multi-speed transmission according to claim 1, wherein when viewed with respect to a spacial layout, the third shift element (C) is axially arranged at least partially between the first planetary gearset (RS1) and the third planetary gearset (RS3).

25. The multi-speed transmission according to claim 1, wherein when viewed with respect to a spacial layout, the third shift element (C) is axially arranged between the first planetary gearset (RS1) and the fourth planetary gearset (RS4).

26. The multi-speed transmission according to claim 1, wherein the third shift element (C) is adjacent the first planetary gearset (RS1).

27. The multi-speed transmission according to claim 1, wherein the third shift element (C) is directly adjacent the third planetary gearset (RS3).

28. The multi-speed transmission according to claim 1, wherein when viewed with respect to a spacial layout, the fourth shift element (D) is located closer to the third planetary gearset (RS3) than the fifth shift element (E).

29. The multi-speed transmission according to claim 1, wherein the fourth shift element (D) is directly adjacent the third planetary gearset (RS3).

30. The multi-speed transmission according to claim 1, wherein when viewed with respect to a spacial layout, the fourth shift element (D) is radially arranged at least partially about the third planetary gearset (RS3).

31. The multi-speed transmission according to claim 1, wherein one-way clutch is located between at least one of the input shaft (AN), the output shaft (AB), the first rotary shaft (1), the second rotary shaft (2), the third rotary shaft (3), the fourth rotary shaft (4), the fifth rotary shaft (5), the sixth rotary shaft (6), the seventh rotary shaft (7) and the eighth rotary shaft (8) and the transmission housing (GG).

32. The multi-speed transmission according to claim 1, wherein an input drive and an output drive of the transmission are located on opposite sides of the housing (GG).

33. The multi-speed transmission according to claim 1, wherein an input drive and an output drive of the transmission are located on a common side of the housing (GG).

34. The multi-speed transmission according to claim 1, wherein at least one of a differential and transfer differential is arranged on the input shaft (AN) and the output shaft (AB).

35. The multi-speed transmission according to claim 1, wherein a coupling element is placed between the drive input shaft (AN) and a drive motor of the motor vehicle.

36. The multi-speed transmission according to claim 35, wherein the coupling element is one of a hydrodynamic converter, a hydraulic clutch, a dry start clutch, a wet start clutch, a magnetic powder clutch and a centrifugal clutch.

37. The multi-speed transmission according claim 1, wherein a driving element is arranged behind the transmission in the flow of force, and the drive input shaft (AN) is connected in one of a rotationally fixed manner and a torsionally flexible manner with a crankshaft of a drive motor.

38. The multi-speed transmission according to claim 1, wherein one of the first shift element (A), the second shift element (B), initiate driving the motor vehicle and the drive input shaft (AN) is connected in one of a rotationally fixed manner and a torsionally flexible manner to a crankshaft of a drive motor.

39. The multi-speed transmission according to claim 1, wherein a torsion vibration damper is arranged between a input drive motor and the transmission.

40. The multi-speed transmission according to claim 1, wherein one of a wear-free brake and an accessory drive is attached to at least one of the input shaft (AN), the output shaft (AB), the first rotary shaft (1), the second rotary shaft (2), the third rotary shaft (3), the fourth rotary shaft (4), the fifth rotary shaft (5), the sixth rotary shaft (6), the seventh rotary shaft (7) and the eighth rotary shaft (8) to drive one of an additional unit, an electric machine, a generator and an additional driving element.

41. The multi-speed transmission according to claim 1, wherein the first shift element (A), the second shift element (B), the third shift element (C), the fourth shift element (D), and the fifth shift element (E) are one of a friction-locked clutch, a friction-locked brake, a multi-disk clutch, a band brake, a cone clutch, a positive locking brake, a cone clutch and a claw clutch.

* * * * *